United States Patent
Taniguchi

(10) Patent No.: US 7,331,702 B2
(45) Date of Patent: Feb. 19, 2008

(54) AGITATION MIXER

(75) Inventor: Toru Taniguchi, Miyazaki (JP)

(73) Assignee: Reika Kogyo Kabushiki Kaisha, Miyazaki-Gun (JP)

(*) Notice: Subject to any disclaimer, the term of this patent is extended or adjusted under 35 U.S.C. 154(b) by 366 days.

(21) Appl. No.: 10/972,355

(22) Filed: Oct. 26, 2004

(65) Prior Publication Data

US 2005/0094486 A1 May 5, 2005

(30) Foreign Application Priority Data

Oct. 31, 2003 (JP) ............................. 2003-371991
Oct. 1, 2004 (JP) ............................. 2004-290788

(51) Int. Cl.
*B01F 11/00* (2006.01)

(52) U.S. Cl. ................ 366/118; 366/154.2; 366/156.1; 366/158.1; 366/177.1; 366/181.1; 366/181.8

(58) Field of Classification Search ................. 366/78, 366/118, 289, 154.2, 156.1, 158.1, 255, 177.1, 366/181.4, 181.1, 181.8
See application file for complete search history.

(56) References Cited

U.S. PATENT DOCUMENTS

| | | | | |
|---|---|---|---|---|
| 554 A | * | 1/1838 | Douglass ..................... | 185/32 |
| 3,318,668 A | * | 5/1967 | Ziehl ........................... | 422/259 |
| 3,669,416 A | * | 6/1972 | Sutter et al. ................. | 366/145 |
| 3,867,397 A | | 2/1975 | Bohner et al. | |
| 4,983,045 A | | 1/1991 | Taniguchi | |
| 5,391,000 A | * | 2/1995 | Taniguchi ................... | 366/332 |
| 6,019,498 A | | 2/2000 | Hamada et al. | |
| 6,435,707 B1 | | 8/2002 | Mori et al. | |

FOREIGN PATENT DOCUMENTS

| | | |
|---|---|---|
| FR | 1 184 392 | 7/1959 |
| FR | 1184392 | 7/1959 |
| FR | 2 161 690 | 7/1973 |
| FR | 2162590 A5 | 7/1973 |
| GB | 2 039 855 | 8/1980 |
| JP | 02 043933 | 2/1990 |
| JP | A 11-19495 | 1/1999 |
| JP | A 2000-246131 | 9/2000 |
| JP | A 2001-62273 | 3/2001 |
| JP | A 2001-65850 | 3/2001 |
| JP | A 2001-198447 | 7/2001 |
| JP | A 2002-166154 | 6/2002 |
| JP | A 2002-248330 | 9/2002 |

* cited by examiner

*Primary Examiner*—David Sorkin
(74) *Attorney, Agent, or Firm*—Oliff & Berridge, PLC

(57) ABSTRACT

An agitation mixer 10 comprises a casing 12 through which a fluid passes, an agitator body 15 installed inside the casing 12 and connected to rotation means 92, a liquid inlet 22 for feeding a liquid into the casing 12, and a powder inlet 24 for feeding a powder into the casing 12. In the agitation mixer 10, the powder inlet 24 is attached to a powder feeding apparatus 55 in which a screw for transporting the powder is installed and connected to rotation-vibration means 53.

35 Claims, 8 Drawing Sheets

AGITATION MIXER

BACKGROUND OF THE INVENTION

1. Field of the Invention

The present invention relates to an agitation mixer which performs agitation mixing by vibrating and/or rotating an agitator body.

2. Description of the Related Art

For example, in mixing processes which include adding a liquid to a powder, adding a powder to a liquid, or simultaneously adding a powder and a liquid, secondary agglomerates ("lumps") of the powder are often produced in the liquid, and, once such lumps have been produced, re-dissolving them in the liquid is usually extremely difficult. In addition, the produced lumps often block a material inlet, often bringing about difficulties in subsequent feeding of a powder.

Accordingly, in recent years, apparatuses and methods capable of suppressing generation of secondary agglomerates during a process of mixing a powder and a liquid have been proposed.

In a continuous mixing device of the prior art, a rotary disc is installed in a casing having supply ports attached to an upper part thereof, for feeding a liquid and a powder, and a discharge port attached to a lower part thereof. The rotary disc separates the inside of the casing into an upper mixing chamber and a lower mixing chamber. Further, a scraper is attached to an upper area of the rotary disc, and a revolving scraper, which revolves independently of the rotary disc in a noncontacting manner, is mounted at a position below the rotary disc. A powder and a liquid fed from the supply ports are mixed by rotation of the rotary disc, and a resultant mixture brought into the lower mixing chamber is scraped off while being mixed by the revolving scraper, which rotates at a speed lower than that of the rotary disc, so as to be continuously transported to the outside via the discharge port (refer to, for example, Japanese Patent Laid-Open Publications Nos. Hei 11-19495, 2001-62273, and 2002-166154).

Further, a continuous mixing device for mixing powder and liquid by means of a rotary mixing disc, in which a liquid is fed in atomized form for uniform mixing of the powder and the liquid, is proposed in, for example, Japanese Patent Laid-Open Publications Nos. 2002-248330 and 2001-198447.

There is further proposed (in, for example, Japanese Patent Laid-Open Publication No. 2001-65850), a method for producing a slurry mixture by mixing a powder such as a coal powder and a liquid such as water. In this method, the powder is fed into a screw pump to which the liquid is further supplied in the midstream portion thereof to be mixed with the powder. The pressure in the screw pump is first boosted and then lowered at a discharge port for transforming the mixture into slurry.

Still further, the applicant of the present invention has proposed (in, for example, Japanese Patent Laid-Open Publication No. 2000-246131), a dispersing apparatus comprising a casing which can hold two or more materials therein, and a grinding spindle installed in the casing. In this dispersing apparatus, pits and projections are formed on at least one of the inner surface of the casing and the outer surface of the grinding spindle, and by reciprocating the grinding spindle in relation to the casing to produce a high pressure in a clearance between the inner surface of the casing and the outer surface of the grinding spindle, at least one out of the above-described two or more materials can be dispersed.

However, among the above-described mixing devices and mixing methods, there is no device and method capable of completely dissolving secondary agglomerates to thereby prevent blockage of a powder inlet. Further, in the above-described mixing devices and methods, limitations are imposed on combinations of powder and liquid to be mixed. Thus, the mixing often fails to achieve the desired quality.

Further, in the mixing devices and methods as described above, uniform mixing is likely to be insufficient in the case of a highly viscous material obtained by mixing, dissolving, chemical reaction, polymerization, or other treatment of liquids.

SUMMARY OF THE INVENTION

An advantage of the present invention is to provide an agitation mixer capable of suppressing generation of secondary agglomerates to thereby prevent blockage of a material inlet caused by the secondary agglomerates during a mixing process of mixing, in particular, a combination of powder and liquid, and capable of mixing substantially unlimited combinations of liquid and powder, including a combination of liquids and a combination of a powder and a liquid. Further, the agitation mixer of the present invention has superior capability to uniformly mix a liquid with another liquid or with a powder, and to induce uniform reaction between liquids or between a liquid and a powder.

An agitation mixer according to the present invention has the following characteristics.

(1) The agitation mixer comprises a casing having a flow channel through which a fluid passes; an agitator body consisting of a shaft installed in the casing and connected to rotation-vibration means, and an agitation blade attached to the perimeter of the shaft; and a material inlet for feeding a raw material into the casing.

By allowing the agitator body to provide vibratory agitation, an agitated substance can be transported to a subsequent stage while being further subjected to uniform agitation. In this manner, smooth agitation-mixing operation can be realized without generation of secondary agglomerates and without retention of the agitated substance in the casing even when the agitated substance becomes highly viscous.

(2) In the agitation mixer according to (1), the shaft consists of a first shaft portion and a second shaft portion, and the rotation-vibration means includes rotation means for rotating the first shaft portion and vibration means for vibrating the second shaft portion.

(3) In the agitation mixer according to (1) or (2), one or more agitation chambers are formed inside the casing by dividing the flow channel with a partition plate.

Provision of the partition plate produces a turbulent flow inside the flow channel in the casing, which contributes to enhancement of agitation efficiency.

(4) In the agitation mixer according to (3), the material inlet consists of a powder inlet and a liquid inlet.

(5) An agitation mixer of another aspect of the invention comprises a casing having a flow channel through which a fluid passes; an agitator body consisting of a shaft installed in the casing and connected to vibration means, and an agitation blade attached to the perimeter of the shaft; and a material inlet for feeding a raw material into the casing, the material inlet consisting of a powder inlet and a liquid inlet.

(6) In the agitation mixer according to any of (1) to (5), the powder inlet is attached to a powder feeding apparatus including a screw for transporting the powder, and the screw is connected to the rotation-vibration means.

(7) In the agitation mixer according to (5), the powder inlet is oriented in a horizontal position in relation to the shaft of the agitator body.

(8) In the agitation mixer according to (5), the powder inlet is oriented in a vertical position in relation to the shaft of the agitator body.

(9) In the agitation mixer according to any one of (1) to (8), the casing further includes a discharge port attached thereto, and a filter for filtering the contents of the casing is provided in the vicinity of the discharge port.

Provision of the filter enables filtering out of an undissolved substance and/or undesired substance, so that a desired object, such as a desired dissolved material, a desired mixture, or a desired reactant, can be obtained.

(10) The agitation mixer according to any one of (1) to (9) further comprises one or more steam inlets for injecting steam into the inside of the casing.

(11) In the agitation mixer according to (10), the raw material is a solid or a powder, and is heated, fused, and/or pasteurized by means of controlling the quantity and/or the pressure of the steam.

(12) In the agitation mixer according to (10), the raw material is a liquid or a fluid, and the viscosity or reaction of the liquid or the fluid is adjusted by means of controlling the quantity and/or the pressure of the steam.

DESCRIPTION OF THE PREFERRED EMBODIMENTS

Figure 1:
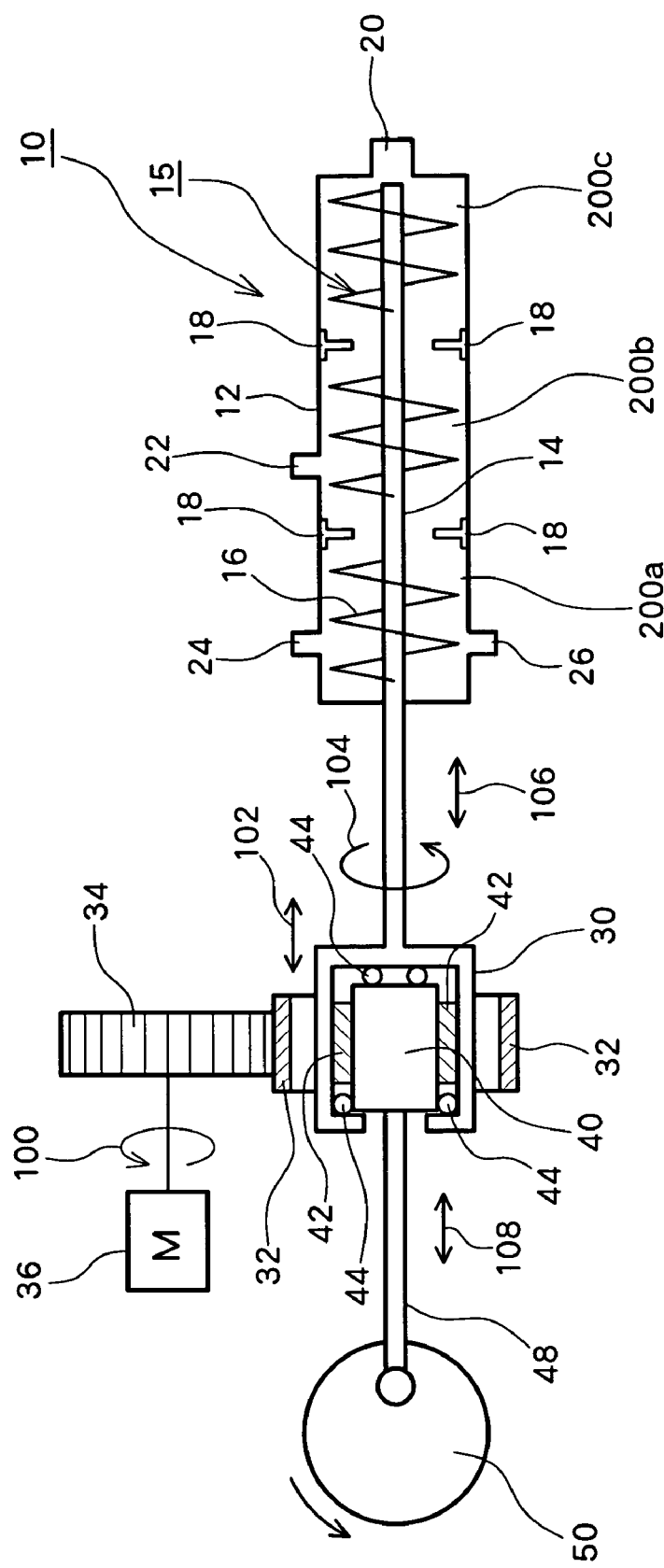
FIG. 1 is a sectional view schematically illustrating a configuration of an agitation mixer according to a first embodiment of the present invention.

Preferred embodiments of this invention will be described below by reference to the attached drawings.

First Embodiment

By reference to FIG. 1, an example configuration of an agitation mixer according to the present invention will now be described.

An agitation mixer 10 comprises a casing 12 including a flow channel through which fluid passes and an agitator body 15 consisting of a first shaft portion 14 installed in the casing 12 and connected to rotation-vibration means, a second shaft portion 48, and an agitation blade 16 attached to the perimeter of the first shaft portion 14. Preferably, the agitation blade 16 is formed in an appropriately selected shape, such as a helix, a bar, etc., depending on a raw material to be agitated.

In an upstream portion of the casing 12, there are provided material inlets 24, 26 for feeding the raw material into the casing 12, while, in a midsection of the casing 12, there is provided a material inlet 22 for feeding a raw material into the casing 12. In a downstream portion of the casing 12, there is provided a discharge port 20 for discharging an agitated substance out of the casing 12.

One or more partition plates 18 are installed in the casing 12 so as to allow passage of a liquid or a powder between the inside of the casing 12 and the flow channel. The inside of the casing 12 is divided by the partition plates 18 so as to form agitation chambers 200*a*, 200*b*, and 200*c*, each sequentially receiving a substance, such as a mixture agitated to a different degree. Dividing the inside of the casing 12 with the partition plates 18 as described above enhances the effect of turbulence. However, the internal configuration of the casing is not limited to the above-described structure, and the partition plate 18 may be omitted, depending on properties of the raw material, so long as agitation mixing can be easily achieved.

The rotation-vibration means consists of rotation means for rotating the first shaft portion 14, and vibration means for vibrating primarily the second shaft portion 48.

The rotation means includes a first gear 34 which is connected to a motor 36 and capable of rotating, a second gear 32 which is engaged with the first gear 34 and capable of rotating in a direction opposite a direction of rotation of the first gear 34, and a gear unit 30 having an outside perimeter wall on which the second gear 32 is mounted, and a bottom surface joined to the first shaft portion 14.

Meanwhile, the vibration means includes an eccentric cam 50 coupled to one end of the second shaft portion 48, a piston 40 connected to the other end of the second shaft portion 48 and disposed in the gear unit 30, and rotation prevention means inserted between the piston 40 and the gear unit 30 to prevent transmission of rotating motion to the piston 40.

In this embodiment, the rotation prevention means comprises a radial bearing 42 inserted between an outside perimeter wall of the piston 40 and an inside perimeter wall of the gear unit 30, and one or two thrust bearings 44 mounted on at least one of a position between the bottom of the piston 40 and an inside base plane of the gear unit 30 and a position between the top of the piston 40 and its opposing surface of the gear unit 30. Provision of the radial bearing 42 as described above protects the piston 40 from transmission of rotating motion of the gear unit 30 transmitted from the first gear 34 and the second gear 32. Meanwhile, provision of the thrust bearing 44 allows the first gear 34 to engage with the second gear 32 for transmission of rotating motion to the gear unit 30 while enabling smooth sliding of the gear unit 30 along a direction indicated by an arrow 102 in synchronism with vibratory motion of the piston 40 reciprocated by the eccentric cam 50.

Next, operation of the agitation mixer 10 according to the present embodiment will be described.

A raw material is fed into the casing 12 via at least one of the material inlets 22, 24, and 26. Meanwhile, the eccentric cam 50 is actuated to reciprocate the second shaft portion 48 along a direction indicated by an arrow 108, which in turn causes the piston 40 connected to the second shaft part 48 to reciprocate along the direction indicated by the arrow 102.

Either simultaneously with or independently of activation of the eccentric cam 50, the motor 36 is actuated to rotate the first gear 34 in a direction indicated by an arrow 100. Rotation of the first gear 34 is transmitted to the second gear 32 engaged with the first gear 34, so that the second gear 32 rotates in the reverse direction in relation to rotation of the first gear 34; in other words, in a direction indicated by an arrow 104. As a result, the gear unit 30 having the second gear 32 mounted on the outside perimeter wall thereof rotates in the direction indicated by the arrow 104, while the first shaft portion 14 coupled with the gear unit 30 rotates in the direction indicated by the arrow 104.

In addition, the reciprocating (vibratory) motion of the piston 40 along the direction indicated by the arrow 102 is transmitted to the gear unit 30, which causes the first shaft part 14 to rotate in the direction of the arrow 104 while reciprocating in the direction of the arrow 106.

In this manner, the agitator body 15 is reciprocated and rotated in the casing 12, thereby providing more uniform agitation, and, even when an agitated substance becomes highly viscous, the agitator body 15 can smoothly execute agitation mixing operation while transporting the agitated substance via the agitation chambers 200a, 200b, and 200c to the discharge port 20.

Second Embodiment

By reference to FIG. 2, another embodiment of the agitation mixer according to the invention will be described and, in particular, a configuration of the rotation-vibration means will be described in detail. Elements corresponding to those described in Embodiment 1 are denoted by the same reference numerals, and their repeated descriptions are omitted.

In the agitation mixer of the first embodiment, the thrust bearing 44 is installed on at least one of the position between the bottom of the piston 40 and the inside base plane of the gear unit 30 and the position between the top of the piston 40 and its opposing surface of the gear unit 30, whereas, in the agitation mixer according to the present embodiment, flat plates 48a and 48b are installed instead of the thrust bearing 44.

Provision of the flat plates 48a and 48b allows the first gear 34 to engage with the second gear 32 for transmission of rotating motion to the gear unit 30 while allowing smooth sliding of the gear unit 30 along the direction indicated by the arrow 102 in synchronism with reciprocating (vibratory) motion of the piston 40 reciprocated by the eccentric cam 50.

Operation of the agitation mixer according to the present embodiment is the same as that of the agitation mixer according to above-described first embodiment, and therefore its repeated description is omitted.

Third Embodiment

Figure 3:
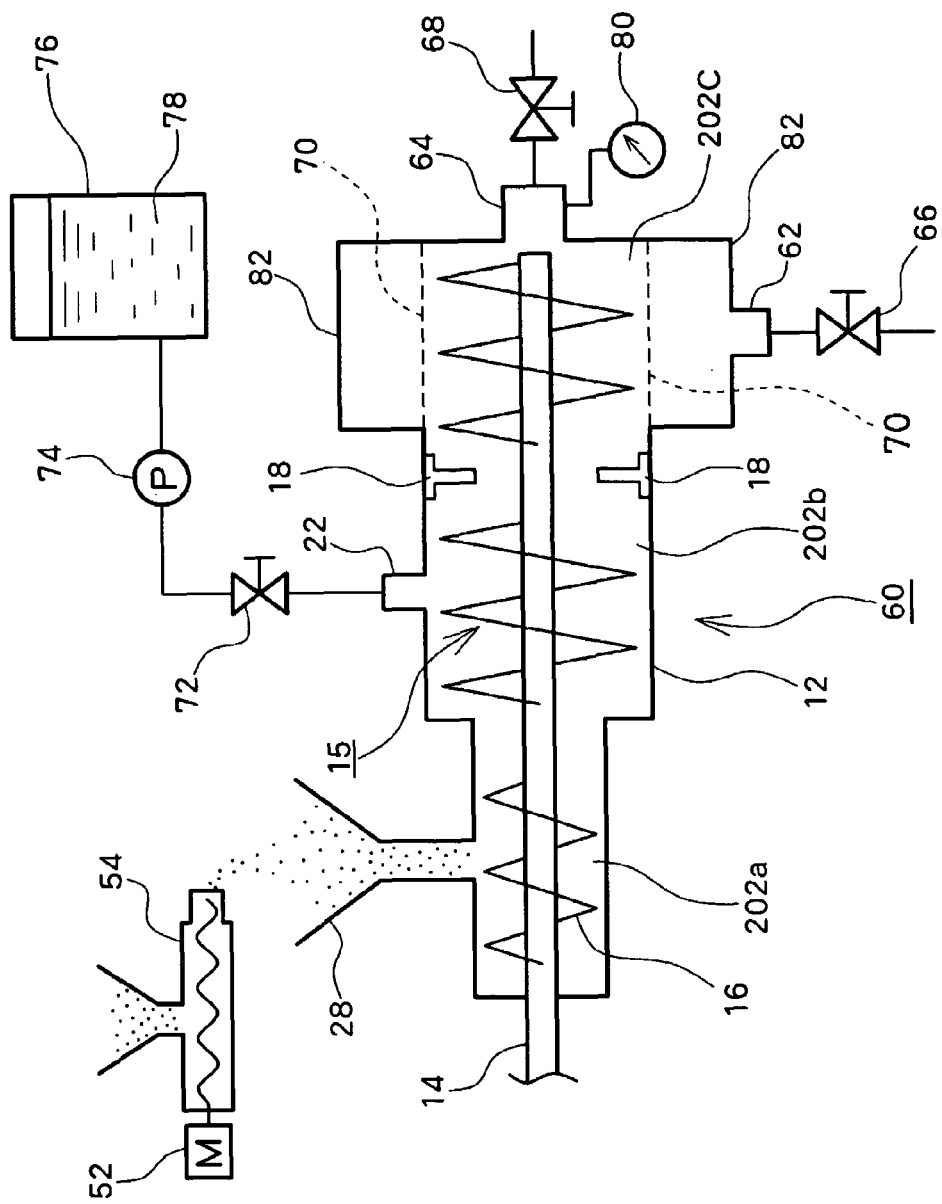
FIG. 3 is a sectional view schematically illustrating a configuration of an agitation mixer according to a third embodiment of the invention.

Still another example of the agitation mixer of the invention; in particular, a detailed construction of the casing, will be described by reference to FIG. 3. Elements corresponding to those described in connection with the first embodiment are denoted by the same reference numerals, and their repeated descriptions are omitted.

In an agitation mixer 60 according to the present embodiment, a powder inlet 28 having the shape of a funnel is attached to an agitation chamber 202a located in the upstream portion of the casing 12, and a liquid inlet 22 is attached to an agitation chamber 202b located in the mid-section of the casing 12. Further, the agitation chamber 202a into which a powder is fed is formed to have a capacity smaller than that of the agitation chamber 202b and that of an agitation chamber 202c. By virtue of this configuration, the powder can be transported downstream from the agitation chamber 202a with almost no residual powder remaining in the agitation chamber 202a, thereby suppressing the generation of secondary agglomerates during subsequent agitation mixing processes of mixing the powder with a liquid, and, in turn, enabling smooth agitation operation.

Above the powder inlet 28, there is provided a powder feeding apparatus 54 having a funnel-shaped powder feeder. Further, to achieve relatively high-speed feeding of a powder, the powder feeding apparatus 54 is provided with an introducer (not shown in FIG. 3; for example, a screw feeder) consisting of an introduction shaft connected to a motor 52, serving as rotation-vibration means or rotation means, and a helical blade attached to the perimeter of the introduction shaft, and a single-shaft eccentric pump (for example, a commercially available NEMO® pump manufactured by HEISHIN Ltd.). Meanwhile, the liquid inlet 22 is connected via a valve 72 and a pump 74 to a liquid reservoir 76 in which a liquid 78 for use in mixing is stored.

In the agitation chamber 202c having an untreated substance removal port 64, a filter 70 is provided so as to enclose the agitator body 15. Through use of the filter 70, even if an untreated substance of the raw material (in the form of, for example, secondary agglomerates or lumps) remains in the casing 12, the untreated substance can be discharged alone via the removal port 64. For example, a filtration member made of stainless steal or ceramic having a mesh whose size is on the order of microns (fine mesh), a reverse osmosis membrane, a polymer membrane (a nano-filter membrane), etc. may be used for the filter 70. In addition, outside the filter 70 of the agitation chamber 202c, there is provided a treatment completion chamber 82 to which a treated substance is fed while being filtered, and the treatment completion chamber 82 has a treated substance removal port 62.

The untreated substance removal port 64 is equipped with a pressure gauge 80 and a discharge valve 68, and the treated substance removal port 62 is equipped with a discharge valve 66.

Next, operation of the agitation mixer 60 according to the present embodiment will be described.

The motor 52 is activated to push out the powder from the powder feeding apparatus 54 in order to feed the powder into the casing 12 via the powder inlet 28 located in the upstream portion of the casing 12. Concurrently, the liquid 78 is supplied from the liquid reservoir 76 by means of the pump 74 and the valve 72 and via the liquid inlet 22 to the inside of the casing 12.

Here, rotating-reciprocating motion of the agitator body 15 is similar to that of Embodiment 1, and therefore its repeated description is omitted.

The treated substance is sequentially transported to the agitation chambers 202a, 202b, and 202c while being agitated by rotating-reciprocating motion of the agitation body 15 and then filtered by the filter 70. The treated substance having been filtered is stored in the treatment completion chamber 82, and then the treated substance may be discharged by means of manually or automatically turning the valve 66 from the closed position to the open position on a continual or intermittent basis. Meanwhile, the untreated substance is discharged by manually or automatically turning the valve 68 from the closed position to the open position when the pressure detected by the pressure gauge 80 exceeds a predetermined pressure.

Fourth Embodiment

Figure 4:
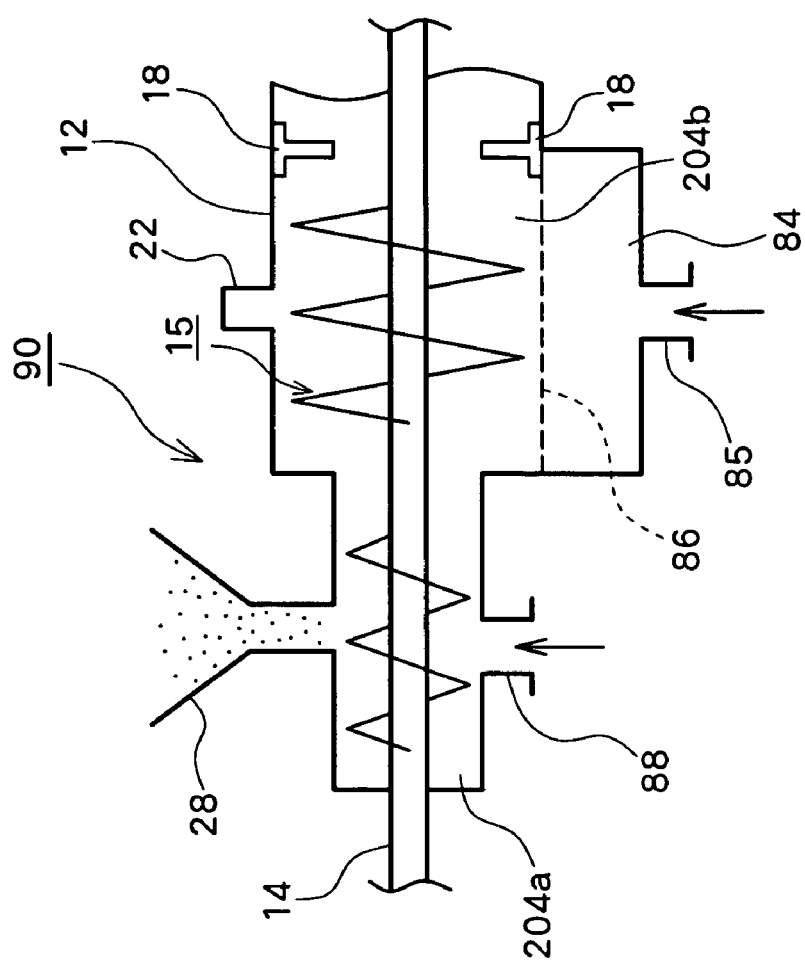
FIG. 4 is a sectional view schematically illustrating a configuration of an agitation mixer according to a fourth embodiment of the invention.

By reference to FIG. 4, another embodiment of the agitation mixer according to the invention; in particular, a detailed configuration of the casing, will now be described. Elements corresponding to those described in the first through third embodiments are denoted by the same reference numerals, and their repeated descriptions are omitted.

In an agitation mixer 90 according to the present embodiment, an agitation chamber 204a located in the upstream portion of the casing 12 where a powder is introduced is formed to have a capacity smaller than that of an agitation chamber 204b. By virtue of this configuration, the powder can be transported downstream with almost no residual powder remaining in the agitation chamber 204a, thereby suppressing generation of the secondary agglomerates while the powder is mixed with a liquid, and, in turn, enabling smooth agitation mixing operation. The agitation chamber 204a further includes a steam inlet 88.

In addition, a steam injection chamber 84 is attached to the agitation chamber 204b where the liquid is introduced, and a filter 86 is provided between the steam injection chamber 84 and the flow channel. The steam injection chamber 84 includes a steam inlet 85. Steam is formed into a uniform mist of desired size by means of passing through the filter 86 and is then injected into the casing 12. Each of the steam inlets 85 and 88 may be equipped with a pressure gauge (not illustrated) for measuring a steam injection pressure, thereby enabling control of the quantity and pressure of the steam. By virtue of this configuration, a powder and/or a mixture of powder and liquid to be fed into the casing 12 can be subjected to effective heating, fusing, and/or pasteurization.

Here, rotating-reciprocating motion of the agitator body 15 is the same as that of the first embodiment, and its repeated description is omitted.

Fifth Embodiment

Figure 5:
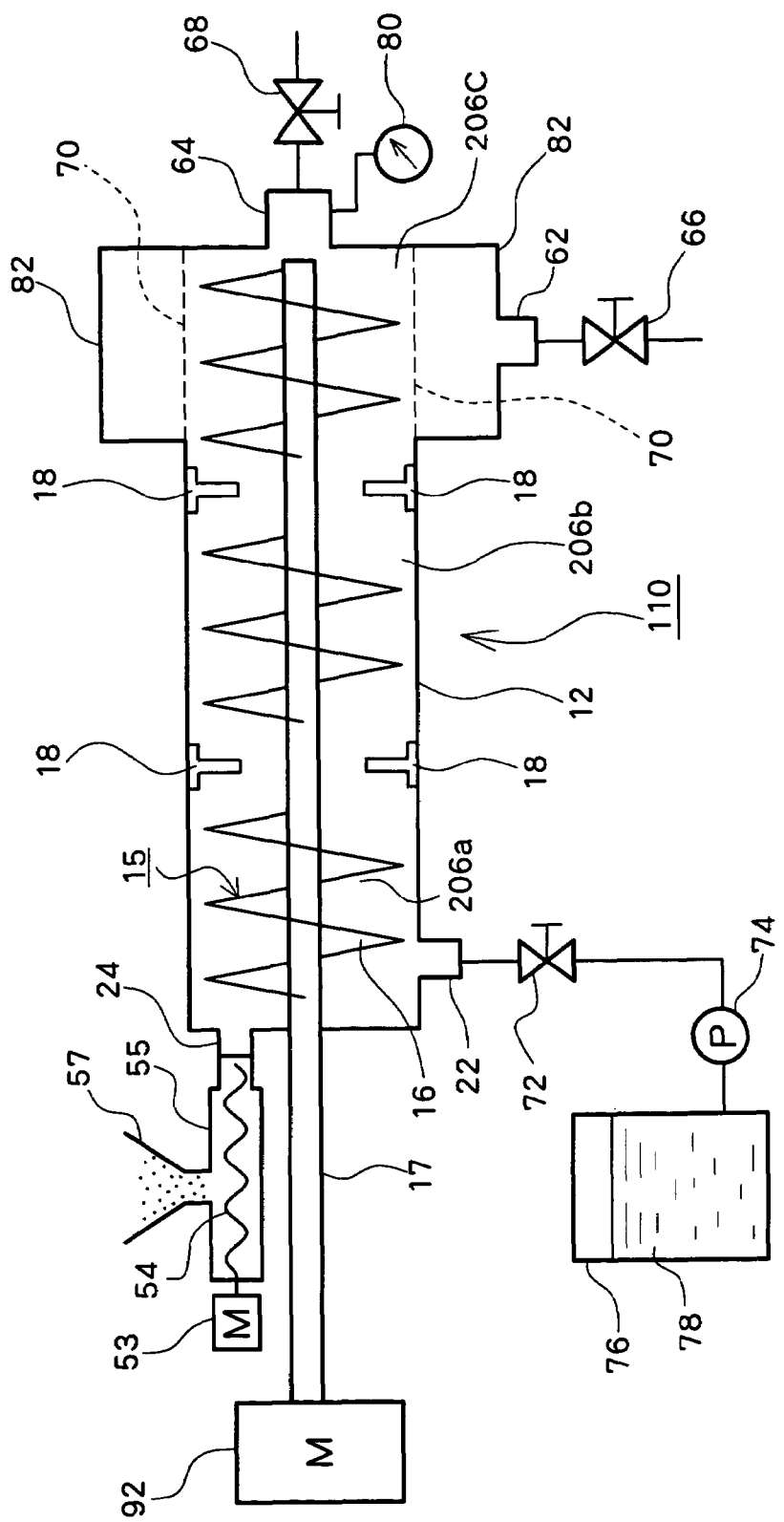
FIG. 5 is a sectional view schematically illustrating a configuration of an agitation mixer according to a fifth embodiment of the invention.

By reference to FIG. 5, another example configuration of the agitation mixer according to the present invention will be described below. Elements corresponding to those described in the first through third embodiments are denoted by the same reference numerals, and their repeated descriptions are omitted.

An agitation mixer 110 comprises the casing 12 including the flow channel through which fluid passes and the agitator body 15 consisting of a shaft 17 installed in the casing 12 and connected to vibration means 92 and the agitation blade 16 attached to the perimeter of the shaft 17. Preferably, the agitation blade 16 is formed in an appropriately selected shape, such as a helix, a bar, etc., depending on the raw material to be agitated.

In the agitation mixer 110 of the present embodiment, an agitation chamber 206a located in the upstream portion of the casing 12 has a powder inlet 24 oriented parallel to the shaft 17, and an agitation chamber 206b located in the midstream of the casing 12 has the liquid inlet 22.

One or more partition plates 18 are installed in the casing 12 so that a liquid or a powder can pass through between the inside of the casing 12 and the flow channel. The inside of the casing 12 divided by the partition plates 18 is formed into agitation chambers 206a, 206b, and 206c, each sequentially receiving a substance, such as a mixture agitated to a different degree. Dividing the inside of the casing 12 with the partition plates 18 as described above enhances the effect of turbulence. However, the internal construction of the casing 12 is not limited to the above-described structure, and the partition plate 18 may be omitted, depending on properties of a raw material, so long as agitation mixing can be easily achieved.

A powder feeding apparatus 55 is disposed on the powder inlet 24, and includes a funnel-shaped powder feeder 57, a screw, and the second shaft portion 48 (as illustrated in FIG. 1) connected to rotation-vibration means 53 for transporting the powder to the powder inlet 24. Preferably, the rotation-vibration means 53 is the rotation-vibration means described in connection with the first and second embodiments 1 and 2 by reference to FIGS. 1 and 2.

In other words, the rotation-vibration means 53 consists of rotation means for rotating the screw instead of the first shaft portion 14 shown in FIG. 1, and vibration means for reciprocating (vibrating) primarily the second shaft portion 48.

The rotation means includes, as shown in FIG. 1, the first gear 34 which is connected to the motor 36 and capable of rotating, the second gear 32 which is engaged with the first gear 34 and capable of rotating in a direction opposite the direction of rotation of the first gear 34, and the gear unit 30 having an outside perimeter wall on which the second gear 32 is mounted and a bottom surface joined to the screw.

Meanwhile, the vibration means includes the eccentric cam 50 coupled to one end of the second shaft portion 48, the piston 40 connected to the other end of the second shaft portion 48 and disposed in the gear unit 30, and the rotation prevention means disposed between the piston 40 and the gear unit 30 for preventing transmission of rotation to the piston 40.

In the present embodiment, the rotation prevention means comprises the radial bearing 42 inserted between the outside perimeter wall of the piston 40 and the inside perimeter wall of the gear unit 30, and one or two thrust bearings 44 mounted on at least one of the position between the bottom of the piston 40 and the inside base plane of the gear unit 30 and the position between the top of the piston 40 and its opposing surface of the gear unit 30. Provision of the radial bearing 42 protects the piston 40 from transmission of rotation of the gear unit 30 transmitted from the first gear 34 and the second gear 32. Meanwhile, provision of the thrust bearing 44 allows the first gear 34 to engage with the second gear 32 for transmission of rotation to the gear unit 30 while allowing smooth sliding of the gear unit 30 along the direction indicated by the arrow 102 in synchronism with reciprocating motion of the piston 40 reciprocated by the eccentric cam 50. The rotation-vibration means is not limited to the above described structure, and may have the structure shown in FIG. 2.

By virtue of this configuration, the powder can be transported to the agitation chamber 206a with almost no residual powder remaining in the powder feeding apparatus 55, and even if the introduced powder adheres to the screw as a result of making contact with the liquid fed in the casing 12, materials adhering onto the screw can be removed from the screw by means of the rotation-vibration means 53. As a result, generation of secondary agglomerates is suppressed in subsequent agitation mixing, so that smooth agitation operation can be achieved.

Meanwhile, the liquid inlet 22 is connected, via the valve 72 and the pump 74, to the liquid reservoir 76 where the liquid 78 for use in mixing is contained.

In the agitation chamber 202c having the untreated substance removal port 64, a filter 70 is disposed so as to enclose the agitator body 15. Through the use of the filter 70, even if an untreated substance of the raw material (in the form of, for example, secondary agglomerates or lumps) remains in the casing 12, the untreated substance can be discharged alone via the removal port 64. For example, a filtration member made of stainless steal or ceramic having a mesh whose size is on the order of the microns (fine mesh), a reverse osmosis membrane, a polymer membrane (a nanofilter membrane), etc. may be used for the filter 70. In addition, outside the filter 70 of the agitation chamber 202c, there is provided the treatment completion chamber 82 in which a treated substance is fed while being filtered, and the treatment completion chamber 82 has the treated substance removal port 62 attached thereto.

The untreated substance removal port 64 is equipped with the pressure gauge 80 and the discharge valve 68, and the treated substance removal port 62 is equipped with the discharge valve 66.

Next, operation of the powder feeding apparatus 55 in the agitation mixer 110 according to the present embodiment will be described.

The rotation-vibration means 53 is actuated to push out the powder from the powder feeding apparatus 55 in order to feed the powder into the casing 12 via the powder inlet 24 located in the upstream portion of the casing 12. Concurrently, the liquid 78 is supplied from the liquid reservoir 76 by means of the pump 74 and the valve 72 and via the liquid inlet 22 to the inside of the casing 12.

Here, in the rotation-vibration means 53, the eccentric cam 50 is actuated, as shown in FIG. 1, in order to reciprocate the second shaft portion 48 along the direction indicated by the arrow 108, which in turn causes the piston 40 connected to the second shaft part 48 to reciprocate along the direction indicated by the arrow 102.

Either simultaneously with or independently of activation of the eccentric cam 50, the motor 36 is actuated to rotate the first gear 34 in a direction indicated by the arrow 100. Rotation of the first gear 34 is transmitted to the second gear 32 engaged with the first gear 34, so that the second gear 32 rotates in the reverse direction relative to rotation of the first gear 34; in other words, in the direction indicated by the arrow 104. As a result, the gear unit 30 having the second gear 32 mounted on the outside perimeter wall thereof rotates in the direction indicated by the arrow 104, while the screw coupled with the gear unit 30 as a substitute for the first shaft portion 14 of FIG. 1 rotates in the direction indicated by the arrow 104.

In addition, the above-described reciprocating motion of the piston 40 along the direction indicated by the arrow 102 is transmitted to the gear unit 30, thereby causing the screw connected to the for rotation-vibration means 53 as a substitute for the first shaft portion 14 to rotate in the direction of the arrow 104 while reciprocating in the direction of the arrow 106.

In this manner, the screw is reciprocated and rotated in the powder feeding apparatus 55, thereby enabling effective transportation of the powder to the agitation mixer 110.

Next, operation of the agitation mixer 110 according to the present embodiment will be described.

The powder fed by the powder feeding apparatus 55 is sequentially transported to the agitation chambers 206a, 206b, and 206c while being treated by agitation. In this embodiment, the agitation body 15 reciprocates using vibration means 92, and the shaft (especially, a screw) in the powder feeding apparatus 55 reciprocates and rotates using rotation-vibration means 53. Then, the treated substance is filtered by the filter 70 and then stored in the treatment completion chamber 82. The stored treated substance may be discharged by means of manually or automatically turning the discharge valve 66 from the closed position to the open position on a continual or intermittent basis. Meanwhile, the untreated substance is discharged by means of manually or automatically turning the discharge valve 68 from the closed position to the open position when the pressure detected by the pressure gauge 80 exceeds a predetermined pressure. The vibration means 92 may be a vibration means by using ultrasonic wave.

Sixth Embodiment

Figure 6:
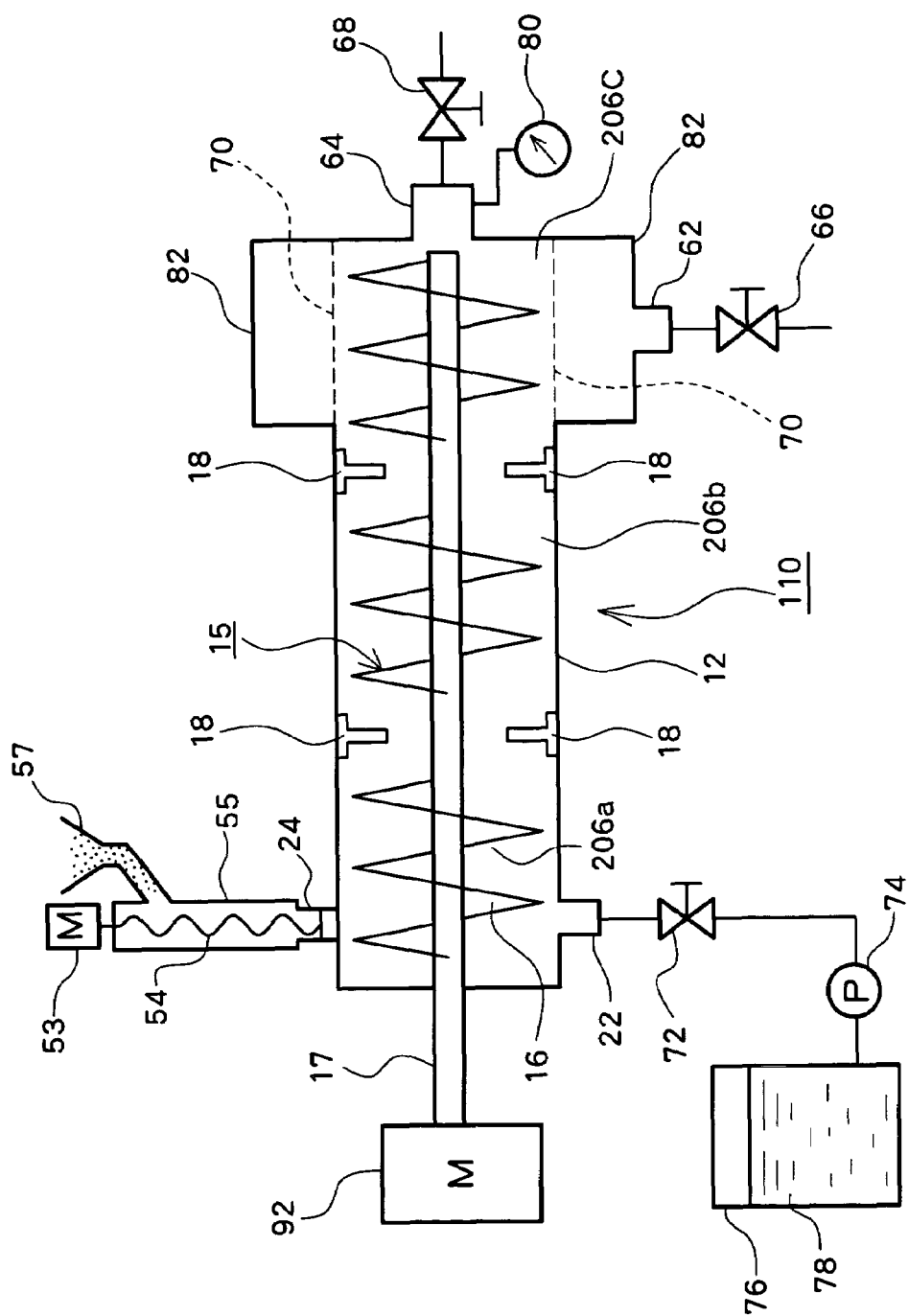
FIG. 6 is a sectional view schematically illustrating a configuration of an agitation mixer according to a sixth embodiment of the invention.

By reference to FIG. 6, still another example configuration of the agitation mixer according to the present invention will now be described. Elements corresponding to those described in connection with the first, third, and fifth embodiments are denoted by the same reference numerals, and their repeated descriptions are omitted.

An agitation mixer 110 according to the present embodiment comprises the casing 12 including the flow channel through which fluid passes and the agitator body 15 consisting of a shaft 17 installed in the casing 12 and connected to vibration means 92 and the agitation blade 16 attached to the perimeter of the shaft 17. Preferably, the agitation blade 16 is formed in an appropriately selected shape, such as a helix, a bar, etc., depending on the raw material to be agitated.

In the agitation mixer 110 according to the present embodiment, an agitation chamber 206a located in the upstream portion of the casing 12 has the powder inlet 24 oriented in a vertical position relative to the shaft 17, and an agitation chamber 206b located in the midstream of the casing 12 has the liquid inlet 22.

The powder feeding apparatus 55 is disposed on the powder inlet 24 and includes the funnel-shaped powder feeder 57, a screw, and the second shaft 48 (as illustrated in FIG. 1) connected to the rotation-vibration means 53 for transporting the powder to the powder inlet 24. Similar to the case of the fifth embodiment, preferably the rotation-vibration means 53 is preferably the rotation-vibration means described in connection with the first and second embodiments by reference to FIGS. 1 and 2.

By virtue of this configuration, the powder can be transported to the agitation chamber 206a with almost no residual powder remaining in the powder feeding apparatus 55, and even if the introduced powder adheres to the screw as a result of making contact with the liquid fed into the casing 12, materials adhering onto the screw can be removed from the screw by means of the rotation-vibration means 53. As a result, generation of secondary agglomerates is suppressed in subsequent agitation mixing, so that smooth agitation operation can be achieved.

Meanwhile, the liquid inlet 22 is connected, via the valve 72 and the pump 74, to the liquid reservoir 76 where the liquid 78 for use in mixing is contained.

In the agitation chamber 206c having the untreated substance removal port 64, the filter 70 is provided so as to enclose the agitator body 15. Through the use of the filter 70, even if an untreated substance of the raw material (in the form of, for example, secondary agglomerates or lumps) remains in the casing 12, the untreated substance can be discharged alone via the removal port 64. For example, a filtration member made of stainless steal or ceramic having a mesh whose size is on the order of microns (fine mesh), a reverse osmosis membrane, a polymer membrane (a nano-filter membrane), etc. may be used for the filter 70. Further, outside the filter 70 of the agitation chamber 206c, there is provided the treatment completion chamber 82 to which the treated substance is fed while being filtered, and the treatment completion chamber 82 has the treated substance removal port 62 attached thereto.

The untreated substance removal port 64 is equipped with the pressure gauge 80 and the discharge valve 68, and the treated object removal port 62 is equipped with the discharge valve 66.

Next, operation of the agitation mixer 110 according to the present embodiment will be described.

The rotation-vibration means 53 is activated to push out the powder from the powder feeding apparatus 55 in order to feed the powder into the casing 12 via the powder inlet 24 located in the upstream part of the casing 12. Concurrently, the liquid 78 is supplied from the liquid reservoir 76 by means of the pump 74 and the valve 72 and via the liquid inlet 22 to the inside of the casing 12.

The powder fed by the powder feeding apparatus 55 is sequentially transported to the agitation chambers 206a, 206b, and 206c of the agitation mixer 110 while being treated by agitation, and then filtered by the filter 70. In this embodiment, the agitation body 15 reciprocates using vibration means 92, and the shaft (especially, a screw) in the powder feeding apparatus 55 reciprocates and rotates using rotation-vibration means 53. The treated substance filtered is then stored in the treatment completion chamber 82. The stored treated substance may be discharged by means of manually or automatically turning the valve 66 from the closed position to the open position on a continual or intermittent basis. Meanwhile, the untreated substance is discharged by means of manually or automatically turning the valve 68 from the closed position to the open position when the pressure detected by the pressure gauge 80 exceeds a predetermined pressure. The vibration means 92 may be a vibration means by using ultrasonic wave.

Seventh Embodiment

Figure 7:
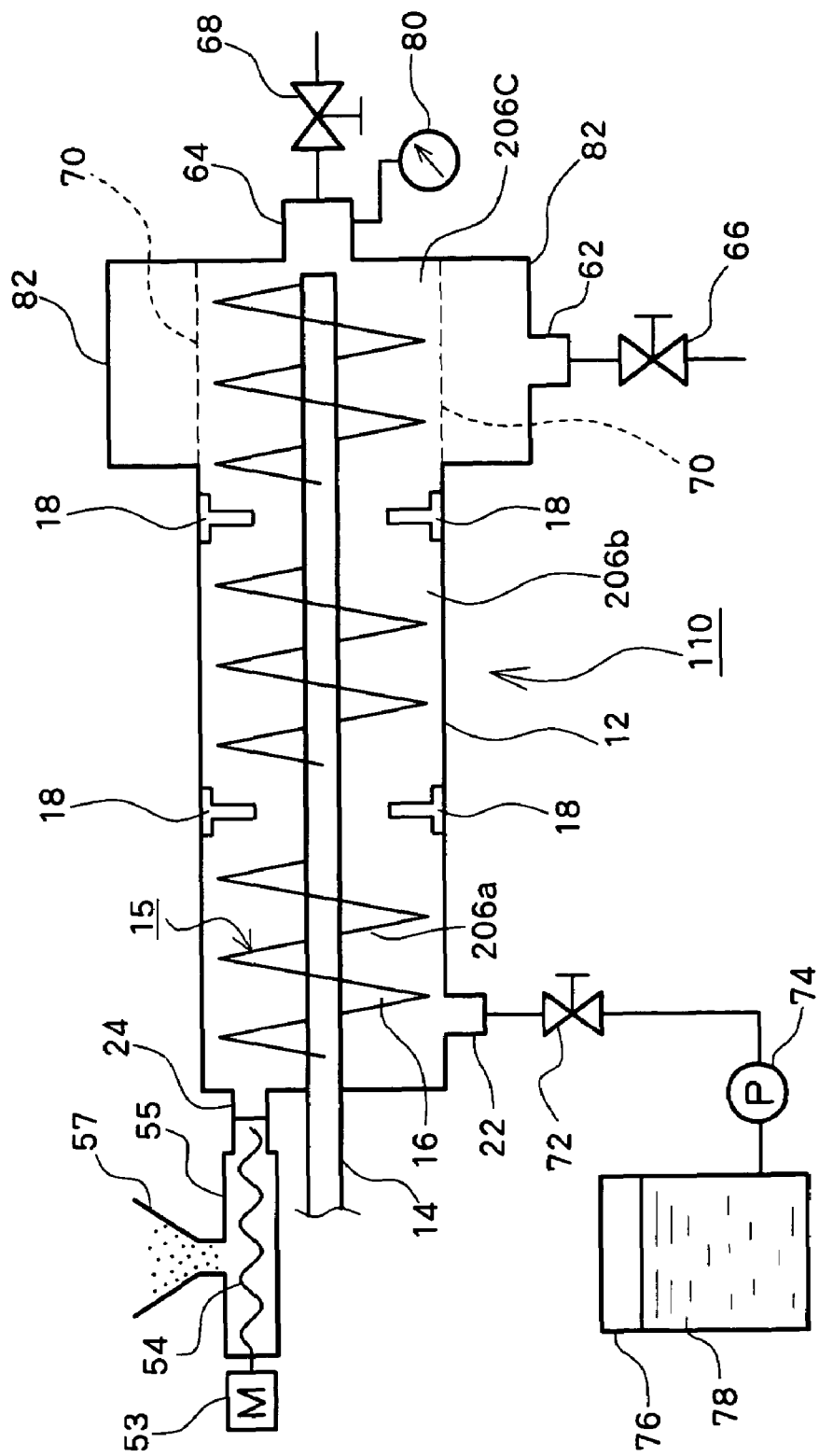
FIG. 7 is a sectional view schematically illustrating a configuration of an agitation mixer according to a seventh embodiment of the invention.

By reference to FIG. 7, another example of the agitation mixer according to the present invention will now be described, while focusing attention on a construction of the casing. Elements corresponding to those described in connection with the first and third embodiments are denoted by the same reference numerals, and their repeated descriptions are omitted.

In an agitation mixer 110 of the present embodiment, the agitation chamber 206a located in the upstream portion of the casing 12 has the powder inlet 24 oriented parallel to the shaft 14, and the agitation chamber 206b located in the midstream portion of the casing 12 has the liquid inlet 22.

Figure 2:
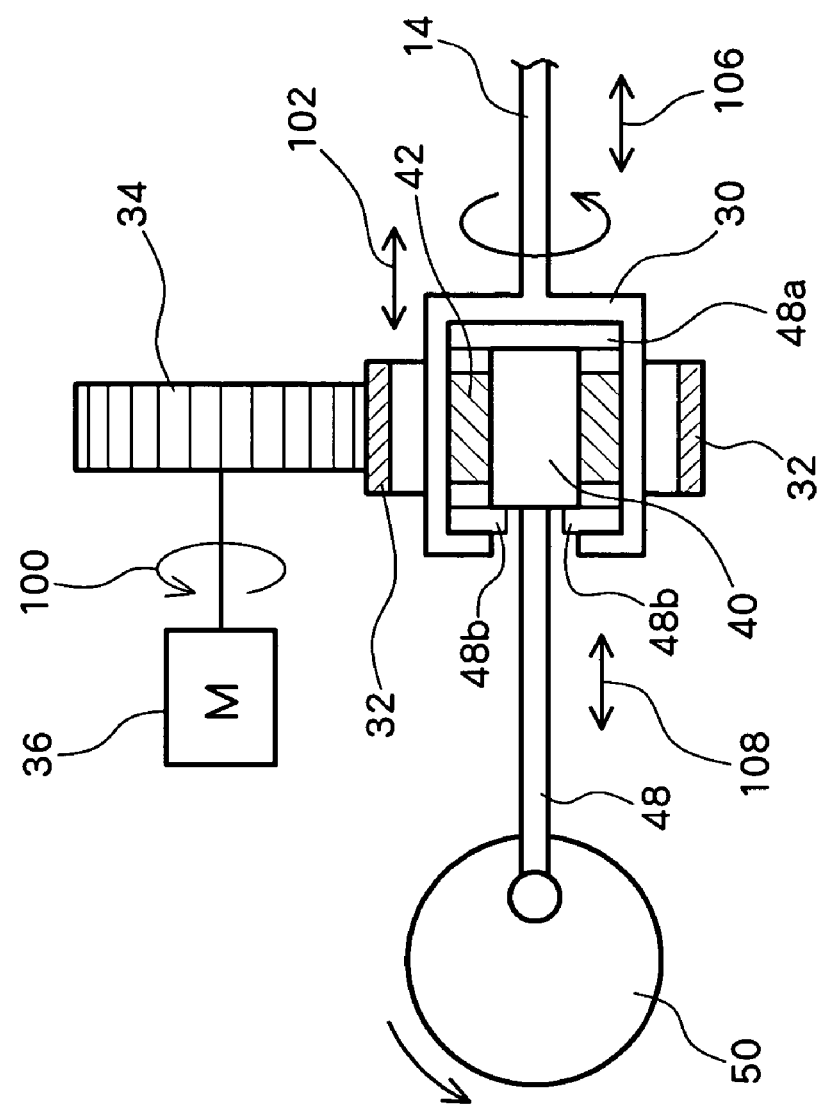
FIG. 2 is a sectional view schematically illustrating a configuration of an agitation mixer according to a second embodiment of the invention.

The shaft 14 in the agitation mixer 110 of the present embodiment is connected to the rotation means shown in FIGS. 1 and 2, and the second shaft portion 48 is connected to the vibration means shown in FIGS. 1 and 2, and the shaft 14 is indirectly connected to the second shaft portion 48, which causes the shaft 14 to rotate while reciprocating (vibrating).

The powder feeding apparatus 55 is placed on the powder inlet 24 and includes the powder funnel-shaped feeder 57 in addition to the screw and the second shaft 48 connected to the rotation-vibration means 53 for enabling transport of the powder to the powder inlet 24. Similar to the case of the fifth and sixth embodiments, the rotation-vibration means 53 is preferably the rotation-vibration means described in connection with the first and second embodiments 1 and 2 by reference to FIGS. 1 and 2.

By virtue of this configuration, the powder can be fed into the agitation chamber 206a with almost no residual powder remaining in the powder feeding apparatus 55, and even if the introduced powder adheres to the screw as a result of making contact with the liquid fed in the casing 12, materials adhering onto the screw can be removed from the screw by means of the rotation-vibration means 53. As a result, generation of secondary agglomerates is suppressed in subsequent agitation mixing, so that smooth agitation operation can be achieved.

Meanwhile, the liquid inlet 22 is connected, via the valve 72 and the pump 74, to the liquid reservoir 76 where the liquid 78 for use in mixing is contained.

In the agitation chamber 206c having the untreated substance removal port 64, the filter 70 is provided so as to enclose the agitator body 15. Through the use of the filter 70, even if an untreated substance of the raw material (in the form of, for example, secondary agglomerates or lumps) remains in the casing 12, the untreated substance can be discharged alone via the removal port 64. For example, a filtration member made of stainless steal or ceramic having a mesh whose size is on the order of microns (fine mesh), a reverse osmosis membrane, a polymer membrane (a nano-filter membrane), etc. may be used for the filter 70. Further, outside the filter 70 of the agitation chamber 206c, there is provided the treatment completion chamber 82 to which the treated subject is transported while being filtered, and the treatment completion chamber 82 has the treated substance removal port 62 attached thereto.

The untreated substance removal port 64 is equipped with the pressure gauge 80 and the discharge valve 68, and the treated substance removal port 62 is equipped with the discharge valve 66.

Next, operation of the agitation mixer 110 according to the present embodiment will be described.

The rotation-vibration means 53 is activated to push out the powder from the powder feeding apparatus 55 in order to feed the powder into the casing 12 via the powder inlet 24 located in the upstream portion of the casing 12. Concurrently, the liquid 78 is supplied from the liquid reservoir 76 by means of the pump 74 and the valve 72 and via the liquid inlet 22 to the inside of the casing 12.

Here, rotating-reciprocating motion of the agitator body 15 is similar to that of the first embodiment, and therefore its repeated description is omitted.

The treated substance which is agitated while passing through the agitation chambers 206a, 206b, and 206c in succession by rotating-reciprocating motion of the agitation body 15 is then filtered by the filter 70. The thus-filtered treated subject is stored in the treatment completion chamber 82. The stored treated substance may be discharged by means of manually or automatically turning the valve 66 from the closed position to the open position on a continual or intermittent basis. Meanwhile, the untreated substance is discharged by means of manually or automatically turning the valve 68 from the closed position to the open position when the pressure detected by the pressure gauge 80 exceeds a predetermined pressure.

Eighth Embodiment

Figure 8:
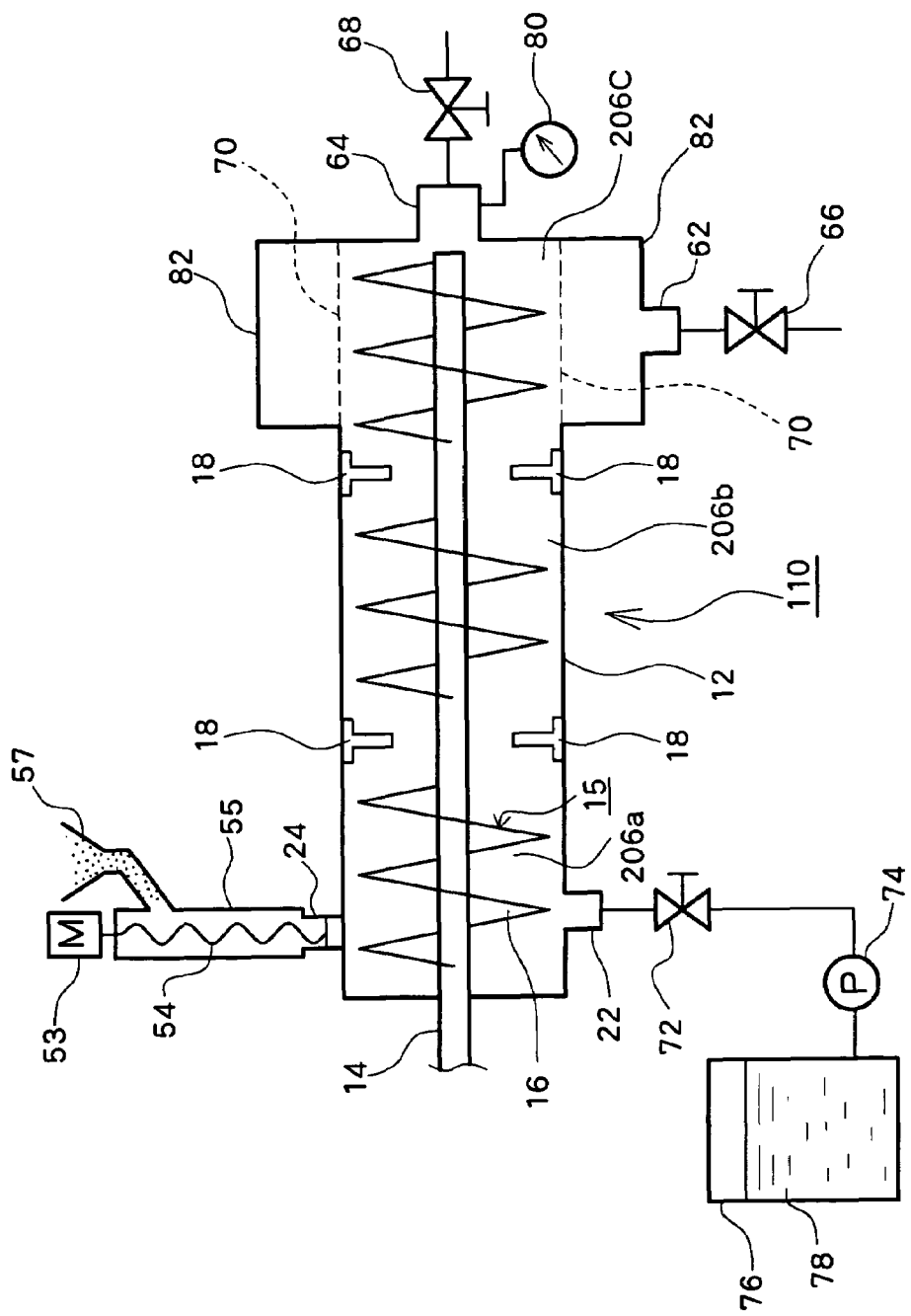
FIG. 8 is a sectional view schematically illustrating a configuration of an agitation mixer according to an eighth embodiment of the invention.

By reference to FIG. 8, another example of the agitation mixer according to the invention will be described, focusing particular attention on a construction of the casing. Elements corresponding to those described in the first and third embodiments are denoted by the same reference numerals, and their repeated descriptions are omitted.

In the agitation mixer 110 according to the present embodiment, the agitation chamber 206a located on the upstream portion of the casing 12 has the powder inlet 24 oriented in a vertical position relative to the shaft 14, whereas the agitation chamber 206b located in the midstream portion of the casing 12 has the liquid inlet 22.

The shaft 14 in the agitation mixer 110 of this embodiment is connected to the rotation means shown in FIGS. 1 and 2, and the second shaft portion 48 is connected to the vibration means shown in FIGS. 1 and 2, and the shaft 14 is indirectly connected to the second shaft portion 48, which causes the shaft 14 to rotate while reciprocating (vibrating).

The powder feeding apparatus 55 is disposed on the powder inlet 24, and includes the funnel-shaped powder feeder 57 in addition to the screw and the second shaft portion 48 connected to the rotation-vibration means 53 for enabling transport of the powder to the powder inlet 24. Similar to the case of the fifth to seventh embodiments, the rotation-vibration means 53 is the rotation-vibration means described in the first and second embodiments by reference to FIGS. 1 and 2.

By virtue of this configuration, the powder can be fed into the agitation chamber 206a with almost no residual powder remaining in the powder feeding apparatus 55, and even if the introduced powder adheres to the screw as a result of making contact with the liquid fed in the casing 12, materials adhering onto the screw can be removed from the screw by means of the rotation-vibration means 53. As a result, generation of secondary agglomerates is suppressed in subsequent agitation mixing, so that smooth agitation operation can be achieved.

Meanwhile, the liquid inlet 22 is connected, via the valve 72 and the pump 74, to the liquid reservoir 76 where the liquid 78 for use in mixing is contained.

In the agitation chamber 206c having the untreated substance removal port 64, the filter 70 is provided so as to enclose the agitator body 15. Through the use of the filter 70, even if an untreated substance of the raw material (in the form of, for example, secondary agglomerates or lumps) remains in the casing 12, the untreated substance can be discharged alone via the removal port 64. For example, a filtration member made of stainless steal or ceramic having a mesh whose size is on the order of microns (fine mesh), a reverse osmosis membrane, a polymer membrane (a nanofilter membrane), etc. may be used for the filter 70. Further, outside the filter 70 of the agitation chamber 206c, there is provided the treatment completion chamber 82 in which the treated substance is fed while being filtered, and the treatment completion chamber 82 has the treated substance removal port 62 attached thereto.

The untreated substance removal port 64 is equipped with the pressure gauge 80 and the discharge valve 68, and the treated substance removal port 62 is equipped with the discharge valve 66.

Next, operation of the agitation mixer 110 according to the present embodiment will be described.

The rotation-vibration means 53 is activated to push out a powder from the powder feeding apparatus 55 in order to transport the powder into the casing 12 via the powder inlet 24 located in the upstream portion of the casing 12. Concurrently, the liquid 78 is supplied from the liquid reservoir 76 by means of the pump 74 and the valve 72 and via the liquid inlet 22 to the inside of the casing 12.

Here, rotating-reciprocating motion of the agitator body 15 is similar to that of the first embodiment, and therefore its repeated description is omitted.

The treated substance which is agitated and sequentially transported to the agitation chambers 206a, 206b, and 206c by rotating-reciprocating motion of the agitator body 15 is filtered by the filter 70. The thus-filtered treated substance is then stored in the treatment completion chamber 82. The stored treated substance may be discharged by means of manually or automatically turning the valve 66 from the closed position to the open position on a continual or intermittent basis. Meanwhile, the untreated substance is discharged by means of manually or automatically turning the valve 68 from the closed position to the open position when the pressure detected by the pressure gauge 80 provided to the untreated substance removal port 64 exceeds a predetermined pressure.

According to the invention, because the agitator body is capable of both reciprocating and rotating, generation of secondary agglomerates can be suppressed during agitation for mixing, for example, a powder and a liquid, thereby preventing blockage in proximity of the material inlet. As a result, subsequent feeding of the raw material can be performed smoothly, which, in turn, brings about improvement in agitation efficiency. Further, even if an agitated substance becomes highly viscous, agitation mixing operation can be executed smoothly while the substance is transported to subsequent stages by the agitator body.

This invention may be applied to use for agitation mixing which is desired to achieve uniform and smooth agitation mixing, for example, when the substance to be agitated is prone to generate secondary agglomerates, and/or the substance to be agitated becomes highly viscous.

The descriptions of Japanese Patent Application No. 2003-371991 filed on Oct. 31, 2003 and Japanese Patent Application No. 2004-290788 filed on Oct. 1, 2004 including the specification, claims, drawings, and abstract, is incorporated herein by reference in its entirety.

What is claimed is:

1. An agitation mixer, comprising:
   a casing having a first casing portion and a second casing portion, the casing including a flow channel through which a fluid passes;
   a powder inlet into said first casing portion, the powder inlet attaching to a powder feeding apparatus for feeding a powder into the casing;
   a liquid inlet into said second casing portion, the liquid inlet attaching to a liquid feeding apparatus for feeding a liquid into the casing; and
   an agitator body comprising (i) a shaft installed inside the casing, connected to a vibration device that vibrates the shaft, and connected to a rotation device that rotates the shaft, and (ii) an agitation blade attached to the perimeter of the shaft, the agitation blade comprising a first agitation blade portion and a second agitation blade portion, wherein
   the first casing portion accommodates the first agitation blade portion and the second casing portion accommodates the second agitation blade portion, and
   the first agitation blade portion has a blade diameter smaller than a blade diameter of the second agitation blade portion.

2. An agitation mixer according to claim 1, wherein said powder inlet is oriented in a horizontal position relative to said shaft of said agitator body.

3. An agitation mixer according to claim 1, wherein said powder inlet is oriented in a vertical position relative to said shaft of said agitator body.

4. An agitation mixer according to claim 1, wherein
the powder feeding apparatus comprises a screw having a screw shaft with a first shaft portion and a second shaft portion, and
a second rotation device engages the first shaft portion and a second vibration device engages the second shaft portion.

5. An agitation mixer according to claim 4, wherein
said casing further includes a removal port, and
a filter which filters contents of said casing is placed in the vicinity of said removal port.

6. An agitation mixer according to claim 4, further comprising one or more steam inlets for injecting steam into the inside of said casing.

7. An agitation mixer according to claim 6, further comprising a device that controls the quantity and/or pressure of said steam, whereby the powder fed into the inside of said casing is heated, fused, and/or pasteurized.

8. An agitation mixer according to claim 6, wherein
said powder and/or said liquid are agitated so as to form a mixture, the agitation mixer further comprising a device that controls the quantity and/or pressure of said steam, whereby viscosity or reaction of the mixture is adjusted.

9. An agitation mixer according to claim 1, wherein
said shaft comprises a first shaft portion and a second shaft portion, and
the first rotation device connected to the shaft engages the first shaft portion and first vibration device vibrates the second shaft portion.

10. An agitation mixer according to claim 1, wherein said first casing portion and said second casing portion are formed by dividing said flow channel with one or more partition plates.

11. An agitation mixer according to claim 10, wherein
said casing further includes a removal port, and
a filter which filters contents of the casing is placed in the vicinity of said removal port.

12. An agitation mixer according to claim 10, further comprising one or more steam inlets for injecting steam into the inside of said casing.

13. An agitation mixer according to claim 12, further comprising a device that controls the quantity and/or pressure of said steam, whereby the powder fed into the inside of said casing is heated, fused, and/or pasteurized.

14. An agitation mixer according to claim 12, wherein
said powder and/or said liquid are agitated so as to form a mixture, the agitation mixer further comprising a device that controls the quantity and/or pressure of said steam, whereby viscosity or reaction of the mixture is adjusted.

15. An agitation mixer according to claim 1, wherein
said casing further includes a removal port, and
a filter which filters contents of said casing is placed in proximity to said removal port.

16. An agitation mixer according to claim 1, further comprising one or more steam inlets for injecting steam into the inside of said casing.

17. An agitation mixer according to claim 16, further comprising a device that controls the quantity and/or pressure of said steam, whereby the powder fed into the inside of said casing is heated, fused, and/or pasteurized.

18. An agitation mixer according to claim 16, wherein
said powder and/or said liquid are agitated so as to form a mixture, the agitation mixer further comprising a device that controls the quantity and/or pressure of said steam, whereby viscosity or reaction of the mixture is adjusted.

19. An agitation mixer according to claim 1, wherein the vibration device comprises an eccentric cam connected to the shaft that reciprocates the shaft.

20. An agitation mixer according to claim 19, wherein
said shaft comprises a first shaft portion and a second shaft portion, and
the first rotation device engages the first shaft portion and the eccentric cam engages the second shaft portion.

21. An agitation mixer according to claim 20, wherein said first casing portion and said second casing portion are formed by dividing said flow channel with one or more partition plates.

22. An agitation mixer according to claim 21, wherein
said casing further includes a removal port, and
a filter which filters contents of said casing is placed in the vicinity of said removal port.

23. An agitation mixer according to claim 21, further comprising one or more steam inlets for injecting steam into the inside of said casing.

24. An agitation mixer according to claim 20, wherein
said casing further includes a removal port, and
a filter which filters contents of said casing is placed in the vicinity of said removal port.

25. An agitation mixer according to claim 20, further comprising one or more steam inlets for injecting steam into the inside of said casing.

26. An agitation mixer according to claim 25, wherein the agitation mixer further comprises a device that controls the quantity and/or pressure of said steam, whereby said liquid is heated, fused, and/or pasteurized.

27. An agitation mixer according to claim 25, wherein the agitation mixer further comprises a device that controls the quantity and/or pressure of said steam, whereby said powder is heated, fused, and/or pasteurized.

28. An agitation mixer according to claim 19, wherein said first casing portion and said second casing portion are formed by dividing said flow channel with one or more partition plates.

29. An agitation mixer according to claim 28, wherein
said casing further includes a removal port, and
a filter which filters contents of said casing is placed in the vicinity of said removal port.

30. An agitation mixer according to claim 28, further comprising one or more steam inlets for injecting steam into the inside of said casing.

31. An agitation mixer according to claim 19, wherein
said casing further includes a removal port, and
a filter which filters contents of said casing is placed in the vicinity of said removal port.

32. An agitation mixer according to claim 19, further comprising one or more steam inlets for injecting steam into the inside of said casing.

33. An agitation mixer according to claim 32, wherein the agitation mixer further comprises a device that controls the quantity and/or pressure of said steam, whereby said liquid is heated, fused, and/or pasteurized.

34. An agitation mixer according to claim 32, wherein the agitation mixer further comprises a device that controls the quantity and/or pressure of said steam, whereby said powder is heated, fused, and/or pasteurized.

35. An agitation mixer comprising:

a casing having a first casing portion and a second casing portion, the casing including a flow channel through which a fluid passes;

a powder inlet into said first casing portion, the powder inlet attaching to a powder feeding apparatus for feeding a powder into the casing;

a liquid inlet into said second casing portion, the liquid inlet attaching to a liquid feeding apparatus for feeding a liquid into the casing;

an agitator body comprising (i) a shaft installed inside the casing, connected to a vibration device that vibrates the shaft, and connected to a rotation device that rotates the shaft, and (ii) a first agitation blade attached to the perimeter of the shaft, and a (iii) second agitator blade attached to the perimeter of the shaft, the agitation blade comprising a first agitation blade portion and a second agitation blade portion, wherein the first casing portion accommodates the first agitation blade and the second casing portion accommodates the second agitation blade, and the first agitation blade has a blade diameter smaller than a blade diameter of the second agitation blade.

* * * * *